(12) United States Patent
Noguchi et al.

(10) Patent No.: US 10,563,749 B2
(45) Date of Patent: Feb. 18, 2020

(54) POWER TRANSMISSION DEVICE

(71) Applicant: AISIN AW CO., LTD., Anjo-shi, Aichi-ken (JP)

(72) Inventors: Akira Noguchi, Anjo (JP); Tomoki Nishikubo, Okazaki (JP); Ren Agatsuma, Shizuoka (JP)

(73) Assignee: AISIN AW CO., LTD., Anjo (JP)

( * ) Notice: Subject to any disclaimer, the term of this patent is extended or adjusted under 35 U.S.C. 154(b) by 150 days.

(21) Appl. No.: 15/735,758

(22) PCT Filed: Jul. 26, 2016

(86) PCT No.: PCT/JP2016/071865
§ 371 (c)(1),
(2) Date: Dec. 12, 2017

(87) PCT Pub. No.: WO2017/022567
PCT Pub. Date: Feb. 9, 2017

(65) Prior Publication Data
US 2018/0163843 A1 Jun. 14, 2018

(30) Foreign Application Priority Data
Jul. 31, 2015 (JP) .................................. 2015-151966

(51) Int. Cl.
*F16H 57/04* (2010.01)
*F16H 57/037* (2012.01)
*F16H 3/66* (2006.01)

(52) U.S. Cl.
CPC ....... *F16H 57/0404* (2013.01); *F16H 57/037* (2013.01); *F16H 57/0402* (2013.01);
(Continued)

(58) Field of Classification Search
CPC ............................. F16H 57/04; F16H 57/0402
See application file for complete search history.

(56) References Cited

U.S. PATENT DOCUMENTS 10,018,265 B2 * 7/2018 Kito .................... F16H 3/663
2016/0076636 A1 * 3/2016 Kito .................... F16H 3/663
475/220

FOREIGN PATENT DOCUMENTS

JP S59-62398 U 4/1984
JP S61-855 U 1/1986
(Continued)

OTHER PUBLICATIONS

Sep. 20, 2016 International Search Report issued in International Patent Application No. PCT/JP2016/071865.

*Primary Examiner* — David R Morris
(74) *Attorney, Agent, or Firm* — Oliff PLC

(57) ABSTRACT

A power transmission device that includes a differential ring gear that meshes with a drive pinion gear to which power from a transmission is transmitted; a differential gear including a differential case coupled to the differential ring gear; a case that houses the differential ring gear and the differential gear; and a resinous partition that partitions an inside of the case into a differential chamber where the differential ring gear and the differential gear are placed and a working oil reservoir chamber to reserve working oil, wherein the partition includes a magnetic plate fixed to a lower part of a side surface thereof that faces the working oil reservoir chamber, and a magnet magnetically attracted and attached to the magnetic plate.

17 Claims, 11 Drawing Sheets

(52) U.S. Cl.
CPC ..... *F16H 57/0424* (2013.01); *F16H 57/0453* (2013.01); *F16H 57/0483* (2013.01); *F16H 3/663* (2013.01); *F16H 3/666* (2013.01); *F16H 57/0457* (2013.01); *F16H 2200/006* (2013.01); *F16H 2200/0086* (2013.01); *F16H 2200/2007* (2013.01); *F16H 2200/2023* (2013.01); *F16H 2200/2046* (2013.01); *F16H 2200/2066* (2013.01); *F16H 2200/2082* (2013.01); *F16H 2200/2097* (2013.01)

(56) References Cited

FOREIGN PATENT DOCUMENTS

| | | |
|---|---|---|
| JP | S63-53068 U | 4/1988 |
| JP | H03-78156 U | 8/1991 |
| JP | 2015-010663 A | 1/2015 |

\* cited by examiner

| | | C-1 | C-2 | C-3 | C-4 | B-1 | B-2 | F-1 |
|---|---|---|---|---|---|---|---|---|
| D | 1st | O | | | | | ● | O |
| | 2nd | O | | | | O | | |
| | 3rd | O | | O | | | | |
| | 4th | O | | | O | | | |
| | 5th | O | O | | | | | |
| | 6th | | O | | O | | | |
| | 7th | | O | O | | | | |
| | 8th | | O | | | O | | |
| REV1 | | | | O | | | O | |
| REV2 | | | | | O | | O | |

※ O : ENGAGED
● : ENGAGED WHEN ENGINE BRAKE IN OPERATION

FIG. 2

POWER TRANSMISSION DEVICE

BACKGROUND

The disclosure according to the present disclosure relates to a power transmission device including a partitioning member that partitions the inside of a case into a differential chamber where a differential ring gear and a differential gear are placed and a working oil reservoir chamber to reserve working oil.

One known power transmission device mounted on a vehicle includes a tubular portion that covers part of a differential gear and a resinous reservoir plate that has a flange portion extending radially from the tubular portion (refer to, for example, Japanese Patent Application Publication No. 2015-010663). In this power transmission device, in order to catch foreign matter contained in working oil in a working oil reservoir chamber, multiple magnets are mounted on the side surface of the flange portion of the reservoir plate facing toward the working oil reservoir chamber and are circumferentially spaced from each other. Each of the magnets is held by a pair of hook portions that are molded as one piece with the flange portion and that project from the side surface of the flange portion to face each other in a top-bottom direction. The two hook portions facing each other are each elastically deformable in the top-bottom direction and hold the magnet that is fitted therebetween in a direction from the tubular portion toward the flange portion to stop the magnet from coming off.

SUMMARY

When a magnet is directly mounted to a resinous reservoir plate (a partitioning member) as in the conventional power transmission device, in order to prevent the magnet from coming off, it is necessary to satisfactorily ensure the strength of a hook portion itself and the strength by which the hook portion holds the magnet. However, the dimensions and strength of the hook portion change in association with thermal deformation (thermal expansion/thermal contraction) of the reservoir plate. Furthermore, while a vehicle equipped with the power transmission device is traveling, vibration from the vehicle is transmitted to the reservoir plate. For this reason, it is not always easy to adequately ensure the strength of the hook portion that is formed as one piece with the flange portion from resin and the strength by which the hook portion holds the magnet. Furthermore, in the conventional power transmission device, the magnet may be displaced relative to the reservoir plate due to the vibration from the vehicle and the change in the dimensions of the hook portion associated with the thermal deformation of the reservoir plate. When the magnet is displaced relative to the reservoir plate, foreign matter attracted and attached to the magnet may come into contact with something such as the hook portion and consequently may be dispersed again into working oil. Therefore, the conventional power transmission device has still room for improvement in terms of fixing the magnet to the reservoir plate.

An exemplary aspect of the present disclosure firmly fixes a magnet for catching foreign matter inside a working oil reservoir chamber defined by a resinous partitioning member to the partitioning member while satisfactorily restraining the foreign matter stuck to the magnet from becoming dispersed.

A power transmission device according to the present disclosure includes: a differential ring gear that meshes with a drive pinion gear to which power from a transmission is transmitted; a differential gear including a differential case coupled to the differential ring gear; a case that houses the differential ring gear and the differential gear; and a resinous partition that partitions an inside of the case into a differential chamber where the differential ring gear and the differential gear are placed and a working oil reservoir chamber to reserve working oil, wherein the partition includes a magnetic plate fixed to a lower part of a side surface thereof that faces the working oil reservoir chamber, and a magnet magnetically attracted and attached to the magnetic plate.

In the power transmission device, the inside of the case that houses the differential ring gear and the differential gear is partitioned by the resinous partition into the differential chamber and the working oil reservoir chamber. Furthermore, the partition includes the magnetic plate fixed to the lower part of the side surface thereof that faces the working oil reservoir chamber and the magnet magnetically attracted and attached to the magnetic plate. Since the magnet is attracted and attached to the magnetic plate fixed to the partition, the resinous partition does not need to have a holding portion, such as a hook portion, for holding the magnet. This makes, without consideration of changes in dimensions and strength of the holding portion associated with thermal deformation of the partition, it possible to mount the magnet to the partition such that the magnet does not become displaced relative to the partition, thus restraining foreign matter attracted and stuck to the magnet from being dispersed again into the working oil by coming in contact with the holding portion or the like due to a relative displacement between the magnet and the holding portion. Accordingly, the power transmission device allows the magnet for catching foreign matter inside the working oil reservoir chamber defined by the resinous partition to be firmly fixed to the partition while satisfactorily restraining foreign matter stuck to the magnet from being dispersed.

BRIEF DESCRIPTION OF THE DRAWINGS

FIG. 2 is an operating table illustrating a relationship between each shift speed of an automatic transmission of the power transmission device and a corresponding operating condition of clutches and brakes.

DETAILED DESCRIPTION OF EMBODIMENTS

Next, an embodiment of the disclosure according to the present disclosure is described with reference to the drawings.

Figure 1:
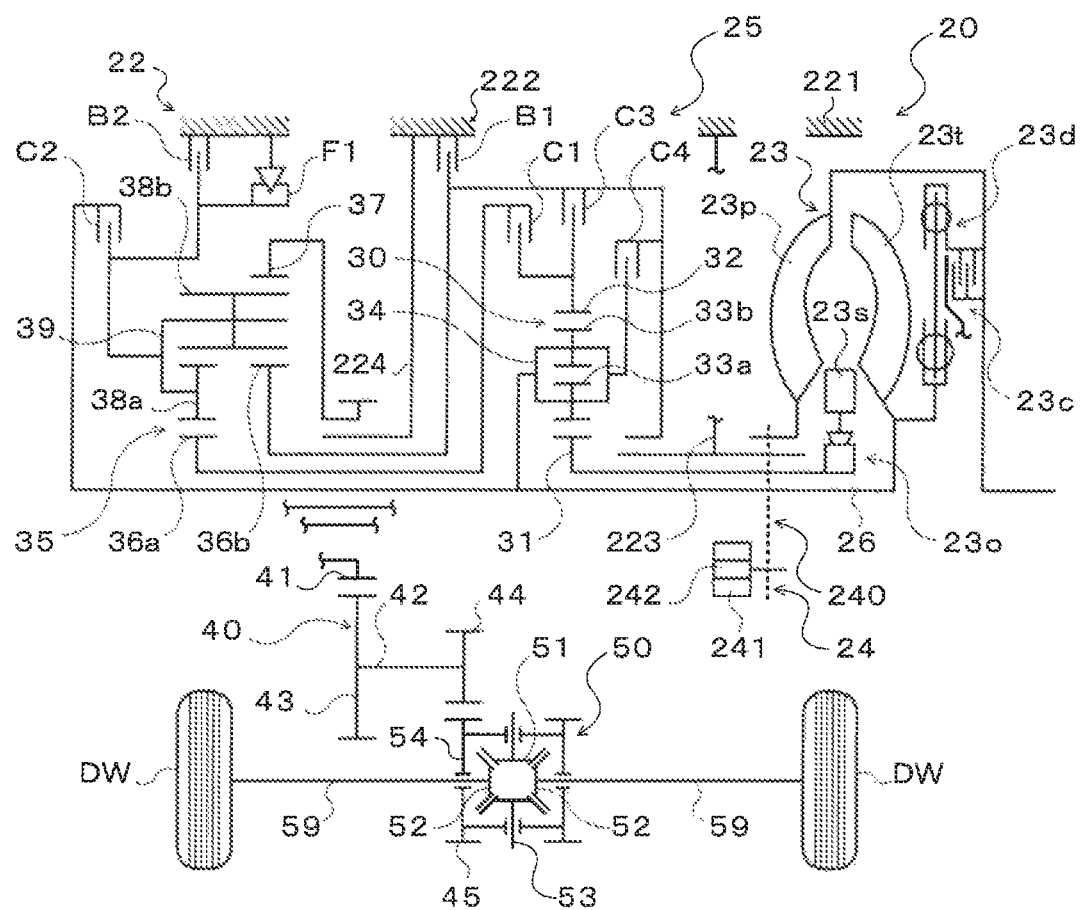
FIG. 1 is a schematic diagram illustrating the structure of a power transmission device according to the present disclosure.

FIG. 1 is a schematic diagram illustrating the structure of a power transmission device 20 according to the present disclosure. The power transmission device 20 illustrated in that drawing is connected to a crankshaft of a non-illustrated engine mounted on a front-wheel drive vehicle to transmit power from the engine to right and left drive wheels DW (front wheels). As illustrated in the drawing, the power transmission device 20 includes a transmission case 22, a starting device (a fluid transmission device) 23, an oil pump 24, an automatic transmission 25 housed in the transmission case 22, a gear mechanism (a gear train) 40, and a differential gear (a differential mechanism) 50.

The transmission case 22 includes a housing 221, a transaxle case 222 fastened (fixed) to the housing 221, a front support 223 located between the housing 221 and the transaxle case 222 and fastened (fixed) to the transaxle case 222, and a center support 224 fastened (fixed) to the transaxle case 222. According to the embodiment, the housing 221, the transaxle case 222, and the center support 224 are made of, for example, aluminum alloy whereas the front support 223 is made of steel (iron alloy) or aluminum alloy.

The starting device 23 includes the following: a front cover coupled via a non-illustrated drive plate to the crank shaft of the engine and/or a rotor of an electric motor; an input-side pump impeller 23p having a pump shell tightly fixed to the front cover; an output-side turbine runner 23t coupled to an input shaft 26 of the automatic transmission 25; a stator 23s that is located inside the pump impeller 23p and the turbine runner 23t and that adjusts the flow of working oil from the turbine runner 23t to the pump impeller 23p; and a one-way clutch 23o that is supported by a non-illustrated stator shaft and that restricts the direction of rotation of the stator 23s to one direction. The pump impeller 23p, the turbine runner 23t, and the stator 23s form a torque converter that have the function of amplifying torque.

The starting device 23 further includes a lock-up clutch 23c for connecting and disconnecting the front cover and the input shaft 26 of the automatic transmission 25, and a damper device 23d for dampening vibration between the front cover and the input shaft 26 of the automatic transmission 25. According to the embodiment, the lock-up clutch 23c is structured as a multi-plate friction hydraulic clutch having multiple friction engagement plates (friction plates and separator plates). Alternatively, the lock-up clutch. 23c may be a single-plate friction hydraulic clutch. Furthermore, the starting device 23 may include a fluid coupling that does not have the stator 23s.

The oil pump 24 is located on an axis different from the input shaft 26 of the automatic transmission 25 and is structured as a gear pump including the following: an external gear (an inner rotor) 241 coupled via a wrapping transmission 240 to the pump impeller 23p of the starting device 23; an internal gear (an outer rotor) 242 that meshes with the external gear; and a pump body and a pump cover (their illustrations are omitted) that define a non-illustrated gear chamber for housing the external gear 241 and the internal gear 242. The oil pump 24 is driven via the wrapping transmission 240 by power from the engine, thus sucking working oil (ATF) reserved in a working oil reservoir chamber 65 (refer to FIG. 3) provided at the bottom of the transaxle case 222 and pumping the working oil to a non-illustrated hydraulic control device. The wrapping transmission 240 includes a drive sprocket that rotates along with the pump impeller 23p of the starting device 23, a driven sprocket that rotates along with the external gear of the oil pump 24, and a chain wrapped around the drive sprocket and the driven sprocket.

The automatic transmission 25 is structured as an eight-speed transmission and, as illustrated in FIG. 1, includes a first planetary gear mechanism 30 of double-pinion type and a second planetary gear mechanism 35 of Ravigneaux type. The automatic transmission 25 further includes four clutches C1, C2, C3, and C4, two brakes B1 and B2, and a one-way clutch F1 to change a power transmission path from an input side to an output side.

The first planetary gear mechanism 30 includes a sun gear 31 (a stationary element) that is an external gear, a ring gear 32 that is an internal gear and that is concentric with the sun gear 31, and a planetary carrier 34 that rotatably (spinably) and revolvably holds multiple sets of two pinion gears 33a and 33b meshing with each other, one of the pinion gears 33a and 33b meshing with the sun gear 31 and the other meshing with the ring gear 32. As illustrated in the drawing, the sun gear 31 of the first planetary gear mechanism 30 is non-rotatably coupled (fixed) to the transmission case 22 via the front support 223, and the planetary carrier 34 of the first planetary gear mechanism 30 is connected to the input shaft 26 such that the planetary carrier 34 is rotatable along with the input shaft 26. Furthermore, the first planetary gear mechanism 30 is structured as a so-called reduction gear, reduces the speed of power transmitted to the planetary carrier 34 as an input element, and outputs the resultant power from the ring gear 32 as an output element.

The second planetary gear mechanism 35 includes a first sun gear 36a and a second sun gear 36b that are each an external gear, a ring gear 37 that is an internal gear and that is concentric with the first and second sun gears 36a and 36b, multiple short pinion gears 38a meshing with the first sun gear 36a, multiple long pinion gears 38b meshing with the second sun gear 36b, the multiple short pinion gears 38a, and the ring gear 37, and a planetary carrier 39 that rotatably (spinably) and revolvably holds the multiple short pinion gears 38a and the multiple long pinion gears 38b. The ring gear 37 of the second planetary gear mechanism 35 serves as an output member of the automatic transmission 25, and the power transmitted from the input shaft 26 to the ring gear 37 is transmitted to the right and left drive wheels DW via a gear mechanism 40, a differential gear 50, and drive shafts 59. Furthermore, the planetary carrier 39 is supported by the transmission case 22 via the one-way clutch F1, and the direction of rotation of the planetary carrier 39 is restricted to one direction by the one-way clutch F1.

The clutch C1 connects and disconnects the ring gear 32 of the first planetary gear mechanism 30 and the first sun gear 36a of the second planetary gear mechanism 35. The clutch C2 connects and disconnects the input shaft 26 and the planetary carrier 39 of the second planetary gear mechanism 35. The clutch C3 connects and disconnects the ring gear 32 of the first planetary gear mechanism 30 and the second sun gear 36b of the second planetary gear mechanism 35. The clutch C4 connects and disconnects the planetary carrier 34 of the first planetary gear mechanism 30 and the second sun gear 36b of the second planetary gear mechanism 35. According to the embodiment, the clutches C1, C2, C3, and C4 are each a multi-plate hydraulic friction clutch having a hydraulic servo that includes a piston, multiple friction engagement plates (friction plates and separator plates), an engagement oil chamber supplied with working oil, and a centrifugal hydraulic pressure cancellation chamber supplied with working oil.

The brake B1 non-rotatably fixes (connects) the second sun gear 36b of the second planetary gear mechanism 35 to the transmission case 22 and unfixes the second sun gear 36b from the transmission case 22. The brake B2 non-rotatably fixes the planetary carrier 39 of the second planetary gear mechanism 35 to the transmission case 22 and unfixes the planetary carrier 39 from the transmission case 22. According to the embodiment, the brakes B1 and B2 are each a multi-plate hydraulic friction brake having a hydraulic servo that includes a piston, multiple friction engagement plates (friction plates and separator plates) and an engagement oil chamber supplied with working oil.

The one-way clutch F1 includes an inner race coupled (fixed) to the planetary carrier 39 of the second planetary gear mechanism 35, an outer race, multiple sprags, multiple springs (plate springs), and a cage. The one-way clutch F1 transmits torque via each of the sprags when the outer race rotates in one direction with respect to the inner race, and causes the inner race and the outer race to rotate relative to each other when the outer race rotates in the other direction with respect to the inner race. Alternatively, the one-way clutch F1 may have a structure other than the sprag-type structure, such as a roller-type structure.

The clutches C1 to C4 and the brakes B1 and B2 operate with working oil supplied thereto and discharged therefrom by the hydraulic control device. FIG. 2 is an operating table illustrating the relationship between each shift speed of the automatic transmission 25 and a corresponding operating state of the clutches C1 to C4, the brakes B1 and B2, and the one-way clutch F1. The automatic transmission 25 establishes first to eighth forward speeds and first and second reverse speeds by controlling the clutches C1 to C4 and the brakes B1 and B2 according to the operating table of FIG. 2. It is noted that at least one of the clutches C1 to C4 and the brakes B1 and B2 may be a meshing engagement element, such as a dog clutch.

The gear mechanism 40 includes a counter drive gear 41 coupled to the ring gear 37 of the second planetary gear mechanism 35 of the automatic transmission 25, a counter driven gear 43 that is fixed to a counter shaft 42 extending parallel to the input shaft 26 of the automatic transmission 25 and that meshes with the counter drive gear 41, a drive pinion gear (a final drive gear) 44 formed on (or fixed to) the counter shaft 42, and a differential ring gear 45 that meshes with the drive pinion gear 44 and that is coupled to the differential gear 50. As illustrated in FIG. 1, the counter drive gear 41 of the gear mechanism 40 is rotatably supported via a bearing by a center support 224 that is fixed to the transaxle case 222 by bolts and that is located between the first and second planetary gear mechanisms 30 and 35. The differential ring gear 45 is a helical gear and is located below the drive pinion gear 44 when the power transmission device 20 is mounted on a vehicle.

Figure 3:
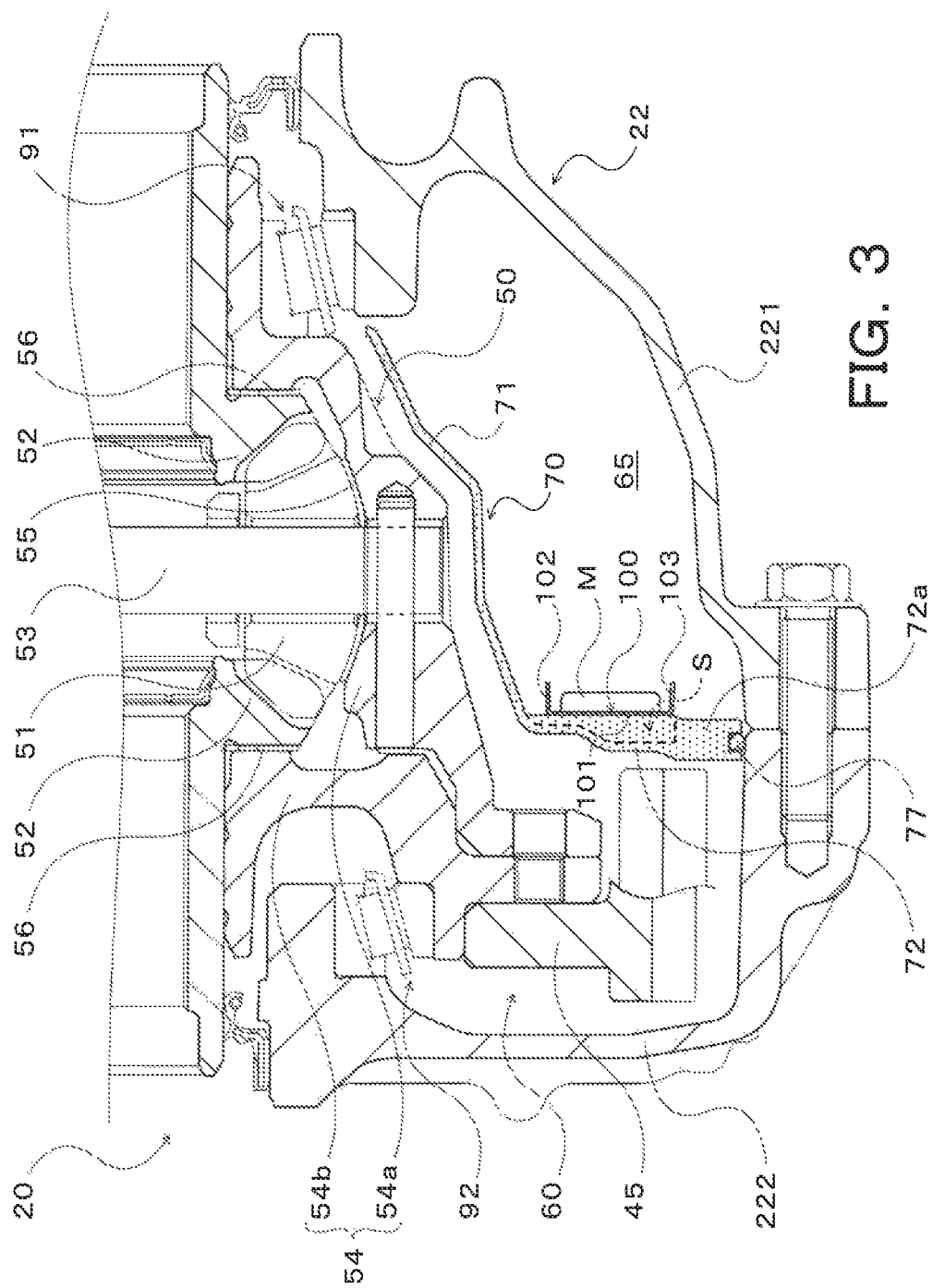
FIG. 3 is an enlarged cross-sectional view illustrating a main part of the power transmission device according to the present disclosure.

As illustrated in FIG. 1 and FIG. 3, the differential gear 50 includes a pair of (two) pinion gears 51, a pair of (two) side gears 52 that is fixed to the drive shaft 59 and that meshes at a right angle with the pair of pinion gears 51, a pinion shaft 53 that supports the pair of pinion gears 51, and a differential case 54 which houses the pair of pinion gears 51 and the pair of side gears 52 and to which the differential ring gear 45 is coupled (fixed). According to the embodiment, the pinion gears 51 and the side gears 52 are each a straight bevel gear. Furthermore, a pinion washer 55 is located between each of the pinion gears 51 and the differential case 54, and a side washer 56 is located between each of the side gears 52 and the differential case 54. The differential case 54 includes a case body 54a and a cover 54b fastened to the case body 54a and is rotatably supported on the same axis as the drive shaft 59 by a bearing 91 and a bearing 92 that are respectively held by the housing 221 and the transaxle case 222.

Figure 4:
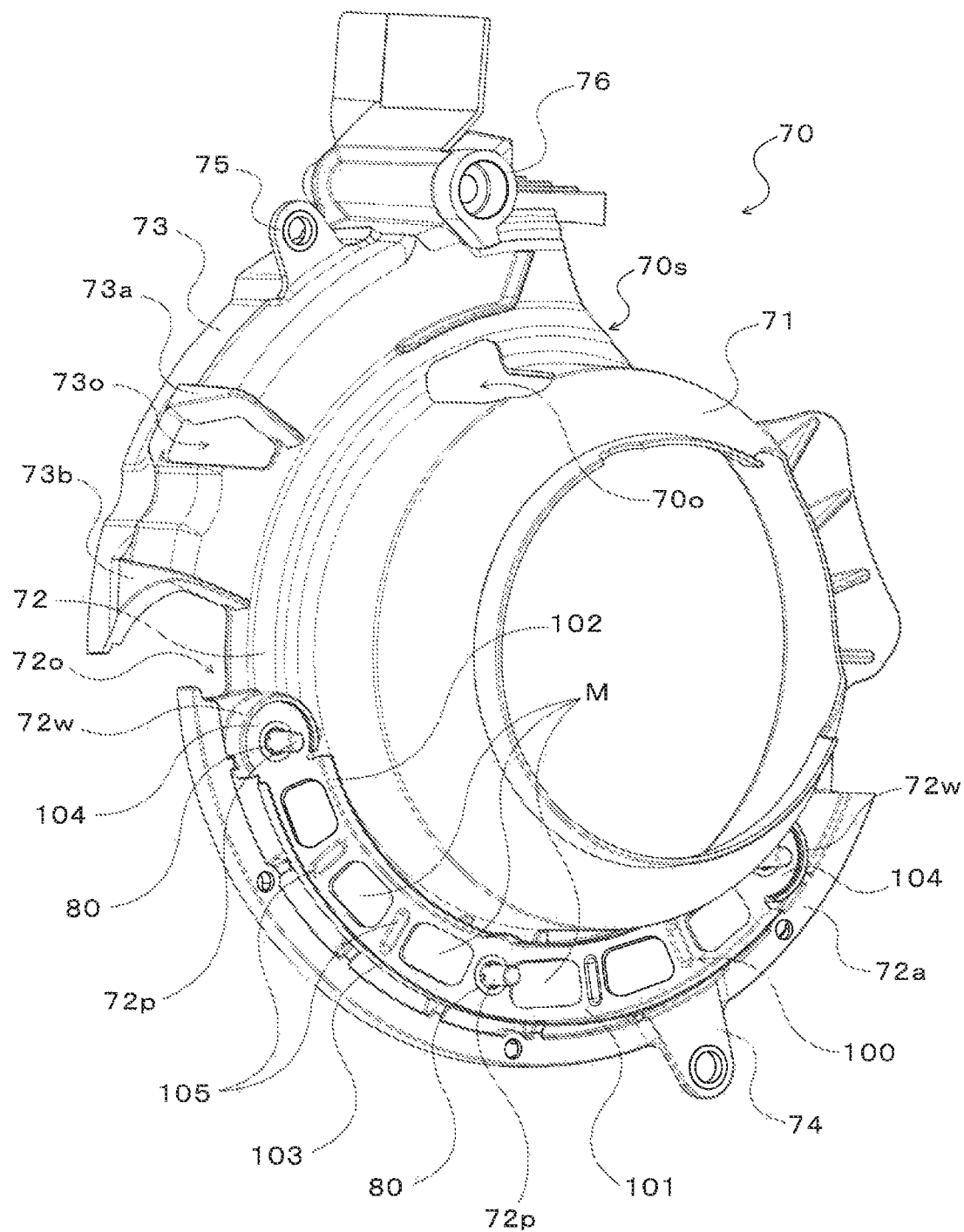
FIG. 4 is a perspective view illustrating a partitioning member of the power transmission device according to the present disclosure.
Figure 5:
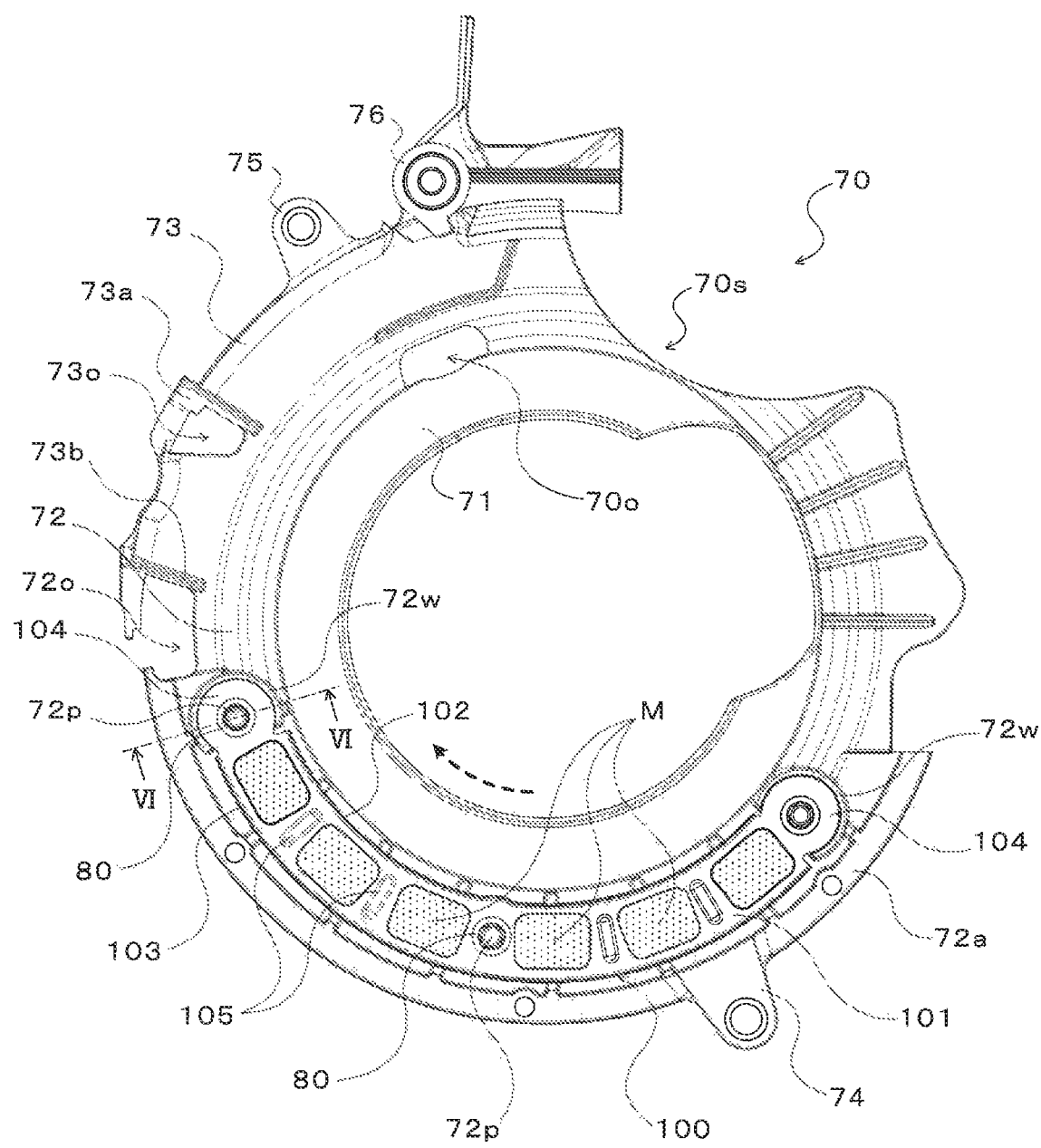
FIG. 5 is a front view illustrating the partitioning member of the power transmission device according to the present disclosure.

As illustrated in FIG. 3, the inside of the transmission case 22 including the housing 221 and the transaxle case 222 is partitioned by a resinous reservoir plate 70 into a differential chamber 60 where the differential ring gear 45 and the differential gear 50 are placed and the working oil reservoir chamber 65 to reserve the working oil. The reservoir plate 70 is fixed to the transmission case 22 and, as illustrated in FIG. 4 and FIG. 5, includes a tubular portion (a cover portion) 71, a flange portion 72 extending from the tubular portion 71 in a radially outward direction of the reservoir plate 70, and a differential ring surrounding portion 73 extending from an upper outer peripheral edge of the flange portion 72. The tubular portion 71, the flange portion 72, and the differential ring surrounding portion 73 are molded together as one piece from resin. In the description below, "upper" and "lower" respectively indicate "upper" or "lower" in a vertical direction when the power transmission device 20 is mounted on a vehicle.

The tubular portion 71 extends along a part of an outer peripheral surface of the differential case 54 of the differential gear 50 and covers (surrounds) the part of the differential case 54 (the case body 54a). The flange portion 72 projects radially outward from an end of the tubular portion 71 at the side (the left side in FIG. 3) close to the transaxle case 222 and extends in an arc shape (in a substantially letter "C" shape) along the end. A lower outer peripheral edge 72a is formed at a substantially lower half of the flange portion 72 and extends along a concave cylindrical, inside bottom surface of the transaxle case 222. The lower outer peripheral edge 72a has a sealing groove formed therein. The tubular portion 71 and the flange portion 72 have an opening 70o formed therein. The opening 70o straddles the tubular portion 71 and the flange portion 72, and is located above the pinion shaft 53 of the differential gear 50. Furthermore, upper parts of the tubular portion 71 and the flange portion 72 are partially cut off so as not to interfere with a non-illustrated bearing that rotatable supports the counter shaft 42. This forms a cut-off portion 70s in the reservoir plate 70.

The differential ring surrounding portion 73 axially extends from the upper outer peripheral edge of the flange portion 72 in a direction away from the tubular portion 71 to cover, from above, substantially one-fourth of an outer circumferential surface of the differential ring gear 45. As illustrated in FIG. 5, the differential ring surrounding portion 73 is located downstream of the lowest point of the reservoir plate 70 in a direction (refer to a broken-line arrow in FIG. 5) that the differential ring gear 45 rotates when a vehicle equipped with the power transmission device 20 moves forward. As illustrated in FIG. 4 and FIG. 5, the flange portion 72 and the differential ring surrounding portion 73 has an opening (an outlet) 73o formed therein. The opening 73o straddles the flange portion 72 and the differential ring surrounding portion 73. Furthermore, an upper projecting portion 73a and a lower projecting portion 73b are molded as one piece with the outer circumferential surface of the differential ring surrounding portion 73 and the outer surface of the flange portion 72. The upper projecting portion 73a axially projects radially outward along an upper edge of the opening 73o. The lower projecting portion 73b is located below the opening 73o and axially projects radially outward along a lower edge of the differential ring surrounding portion 73. In addition, the flange portion 72 has an outlet (a cut-off portion) 72o formed therein. The outlet 72o is located below the lower projecting portion 73b.

The reservoir plate 70 further includes a first fixing portion 74 that extends radially outward from the lower outer peripheral edge 72a of the flange portion 72, and second and third fixing portions 75 and 76 that are spaced from each other and that each extend radially outward from the differential ring surrounding portion 73. The first and second fixing portions 74 and 75 are fixed by bolts or the like to the transaxle case 222 of the transmission case 22. The third fixing portion 76 has a non-illustrated fitting portion axially projecting in a direction away from the tubular portion 71, and the fitting portion is fitted in a non-illustrated hole formed in the transaxle case 222.

When the first, second, and third fixing portions 74, 75, and 76 are fixed to the transmission case 22, the lower outer peripheral edge 72a of the flange portion 72 faces the inside bottom surface of the transaxle case 222 with a slight clearance therebetween, and, as illustrated in FIG. 3, a scaling member 77 is located between the sealing groove in the lower outer peripheral edge 72a and the inside bottom surface of the transaxle case 222. As illustrated in FIG. 3, in the transmission case 22, the differential chamber 60 is defined to the left of the reservoir plate 70 in the drawing, the working oil reservoir chamber 65 is defined to the right of the reservoir plate 70 in the drawing, and a lower part of the flange portion 72 of the reservoir plate 70 faces the working oil reservoir chamber 65.

Furthermore, according to the embodiment, as illustrated in. FIG. 4 and FIG. 5, the reservoir plate 70 includes a metal plate (a magnetic plate) 100 made of magnetic metal and multiple magnets (permanent magnets) M magnet attracted and attached to the metal plate 100. The metal plate 100 is fixed to a side surface of the reservoir plate 70 facing the working oil reservoir chamber 65, i.e., fixed to the lower part of the flange portion 72. The metal plate 100 is shaped by, for example, stamping, in an arc shape with a circumference slightly shorter than that of the lower outer peripheral edge 72a of the reservoir plate 70, and includes a bottom portion 101 extending in an arc shape, an upper rib 102 extending in an arc shape along an upper edge of the bottom portion 101, and a lower rib 103 extending in an arc shape along a lower edge of the bottom portion 101. As illustrated in FIG. 4, the upper rib 102 and the lower rib 103 project from the bottom portion 101 in the same direction as each other. The height of the upper rib 102 and the lower rib 103, i.e., an amount by which the upper rib 102 and the lower rib 103 project from a front surface (the surface facing the working oil reservoir chamber 65) of the bottom portion 101 is set greater than the thickness of the magnets M (the thickness from the front surface of the bottom portion 101 to the surface of the magnets M facing the working oil reservoir chamber 65).

Furthermore, the metal plate 100 has a substantially disk-shaped held portion 104 formed at each end thereof. Each of the held portions 104 extends from a corresponding end of the bottom portion 101 and has an arc-shaped (according to the embodiment, a major arc-shaped) outer circumferential surface. Each of the held portions 104 has a through hole (according to the embodiment, a circular hole) formed in the vicinity of the center thereof, and the bottom portion 101 has a through hole (according to the embodiment, a circular hole) formed in the vicinity of the middle in the circumferential direction (in the longitudinal direction) thereof. The bottom portion 101 further has multiple projecting portions 105 that project from the front surface thereof in the same direction as the upper rib 102 and the lower rib 103 and that are spaced from each other in the circumferential direction (in the longitudinal direction). According to the embodiment, each of the projecting portions 105 is shorter in height than the upper rib 102 and the lower rib 103.

Figure 6:
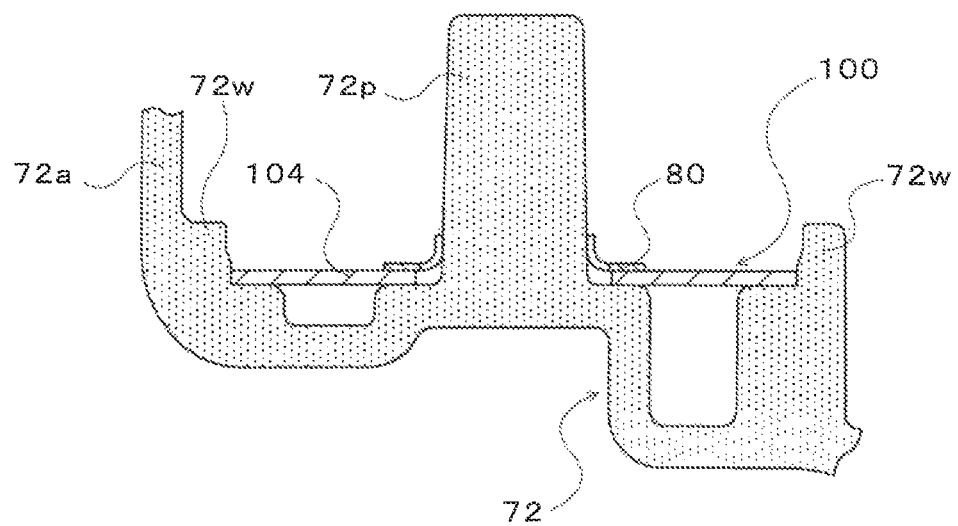
FIG. 6 is an enlarged cross-sectional view taken along line VI-VI in FIG. 5.

On the other hand, as illustrated in FIG. 4 to FIG. 6, the flange portion 72 of the reservoir plate 70 has multiple projections 72p that are erected to project toward the working oil reservoir chamber 65 and that are circumferentially spaced from each other so as to be insertable in the respective holes in the metal plate 100. Furthermore, a holding wall portion 72w is formed around each of the two projections 72p located at the ends, out of the multiple projections 72p. The holding wall portion 72w projects toward the working oil reservoir chamber 65 and extends in an arc shape (according to the embodiment, in a major arc shape) to surround the corresponding projection 72p. Each of the two holding wall portions 72w has a concave cylindrical, inner circumferential surface with a radius of curvature slightly greater than that of the outer circumferential surface of the held portion 104 of the metal plate 100.

The metal plate 100 is fixed to the flange portion 72 of the reservoir plate 70 by inserting the projections 72p into the facing through holes of the metal plate 100 with the upper rib 102 and the lower rib 103 extending substantially in the same direction as the tubular portion 71 of the reservoir plate 70 and by fitting the held portions 104 of the metal plate 100 into the respective holding wall portions 72w. Next, as illustrated in FIG. 6, a stopper ring 80 made of, for example, metal is press-fitted on each of the projections 72p projecting through the through holes. This facilitates positioning the metal plate 100 relative to the reservoir plate 70, thus improving workability, and also makes it possible that the metal plate 100 is firmly fixed to the flange portion 72 of the reservoir plate 70 so as not to rattle. An alternative to the stopper ring 80 may be formed as one piece with the metal plate 100. The projection 72p may be press-fitted into the through hole in the metal plate 100, thus making it possible to omit the stopper ring 80.

The multiple magnets M are magnetically attracted and attached to the metal plate 100 before or after the metal plate 100 is fixed to the reservoir plate 70. As illustrated in FIG. 5, the multiple magnets M are located between the upper rib 102 and the lower rib 103 and are spaced from each other along the upper rib 102 and the lower rib 103 on the front surface (the surface facing the working oil reservoir chamber 65) of the bottom portion 101. Each of the projecting portions 105 of the metal plate 100 is located between adjacent ones of the magnets M. Furthermore, according to the embodiment, as illustrated in FIG. 2, a space S is defined between the surface of the metal plate 100 opposite the surface that the magnets M are attracted and attached to, i.e., the surface of the metal plate 100 close to the differential chamber 60 and the surface (the side surface close to the working oil reservoir chamber 65) of the flange portion 72 of the reservoir plate 70. Moreover, according to the embodiment, the flange portion 72 has multiple circumferentially-spaced ribs that extend in the radial direction of the reservoir plate 70 to abut against a back surface (the surface close to the differential chamber 60) of the bottom portion 101 of the metal plate 100.

In the power transmission device 20 including the reservoir plate 70 that is structured as described above, working oil sucked by the oil pump 24 is reserved in the working oil reservoir chamber 65. Furthermore, working oil passed through components, such as the automatic transmission 25, to be lubricated/cooled, the bearing 91, and so on flows from above into the working oil reservoir chamber 65. Furthermore, working oil as a lubricating/cooling medium dripping from a non-illustrated cooling pipe placed inside the transmission case 22 is supplied around the pinion shaft 53 of the differential gear 50 through the opening 70o in the reservoir plate 70. Moreover, working oil as a lubricating/cooling medium is supplied from above to the bearing 92 through a non-illustrated oil passage formed in the transaxle case 222 and so on. Thus, the working oil passed through the differential gear 50, the bearing 92, and so on is accumulated in a lower part of the differential chamber 60.

When a vehicle equipped with the power transmission device 20 moves forward, the working oil accumulated in the lower part of the differential chamber 60, i.e., accumulated around the lower part of the differential ring gear 45 is scooped up by the differential ring gear 45 that rotates in the direction indicated by the broken-line arrow in FIG. 5, so that most of the working oil is discharged to the outside of the differential chamber 60 through the outlet 72o in the flange portion 72 and the opening 73o in the differential ring surrounding portion 73. This restrains excessive working oil from being accumulated in the differential chamber 60, thus satisfactorily reducing agitation resistance exerted by the working oil on the differential ring gear 45. The working oil discharged to the outside of the differential chamber 60 through the outlet 72o hits against the lower projecting portion 73b and thus is guided below the reservoir plate 70 and toward the working oil reservoir chamber 65. Furthermore, the working oil discharged to the outside of the differential chamber 60 through the opening 73o hits against the upper projecting portion 73a extending along the upper edge of the opening 73o, thus is guided below the reservoir plate 70, and returns to the working oil reservoir chamber 65 by moving on the tubular portion 71.

Inside the working oil reservoir chamber 65, foreign matter such as a tiny piece of metal produced by gear meshing or the like and mixed in the working oil flowing into the working oil reservoir chamber 65 is magnetically attracted by the multiple magnets M attached to the reservoir plate 70 via the metal plate 100 and sticks to the magnets M. Since the magnets M are attracted and attached to the metal plate 100 fixed to the reservoir plate 70, the resinous reservoir plate 70 does not need to have a holding portion, such as a hook portion, for holding the magnets M. This makes, without consideration of changes in dimensions and strength of the holding portion associated with thermal deformation of the reservoir plate 70, it possible to mount the magnets M to the reservoir plate 70 such that the magnets M do not become displaced relative to the reservoir plate 70, thus restraining foreign matter attracted and stuck to the magnets M from being dispersed again into the working oil by coming in contact with the holding portion or the like due to a relative displacement between the magnets M and the holding portion. Accordingly, the power transmission device 20 allows the magnets M for catching foreign matter inside the working oil reservoir chamber 65 defined by the resinous reservoir plate 70 to be firmly fixed to the reservoir plate 70 while satisfactorily restraining the foreign matter stuck to the magnets M from being dispersed.

Furthermore, the upper rib 102 and the lower rib 103 of the metal plate 100 to which the multiple magnets M are attracted and attached allow the metal plate 100 to have more strength. Accordingly, the power transmission device 20 reduces vibration of the metal plate 100 and restrains the metal plate 100 from becoming deformed (bent) when vibration from a vehicle is transmitted to the reservoir plate 70, thus highly satisfactorily restraining the magnets M magnetically attracted and attached to the metal plate 100 from coming off. In addition, the upper rib 102 and the lower rib 103 that project toward the working oil reservoir chamber 65 restrain strong flow of the working oil from occurring around the magnets M, such as when a vehicle starts suddenly, stops suddenly, or moves over a bump. This satisfactorily restrains the magnets M from being displaced by the flow of working oil and also satisfactorily restrains foreign matter stuck to the magnets M from being dispersed into the working oil.

Furthermore, in the power transmission device 20, the amount by which the upper rib 102 and the lower rib 103 project from the front surface of the bottom portion 101 (the metal plate 100) to which the magnets M are attracted and attached is set greater than the thickness from the front surface to the surface of the magnets M facing the working oil reservoir chamber 65. This allows the metal plate 100 to have much more strength while highly satisfactorily restraining strong flow of the working oil from occurring around the magnets M. In addition, the metal plate 100 has the multiple projecting portions 105, each located between adjacent ones of the magnets M and projecting from the front surface of the bottom portion 101 (the metal plate 100) toward the working oil reservoir chamber 65. This highly satisfactorily restrains the magnets M from being displaced relative to the metal plate 100 due to the vibration of the metal plate 100 and the flow of working oil.

Furthermore, according to the embodiment, the multiple magnets M are located below the outlet 72o (and the opening 73o) formed in the flange portion 72 of the reservoir plate 70. This makes it possible to quickly catch foreign matter that is contained in the working oil flowed into the working oil reservoir chamber 65 through the outlet 72o. Moreover, the multiple magnets M are arranged in an arc pattern on the metal plate 100. This increases design flexibility using the general-purpose magnets M while appropriately ensuring the area to which foreign matter is attracted and stuck. Furthermore, according to the embodiment, the space S is defined between the surface of the metal plate 100 close to the differential chamber 60 and the surface of the flange portion 72 of the reservoir plate 70. This allows a part of each of the magnets N facing the metal plate 100 (the differential chamber 60) to be used as a portion to which foreign matter is attracted and stuck, thus increasing the area to which foreign matter is attracted and stuck.

Figure 7:
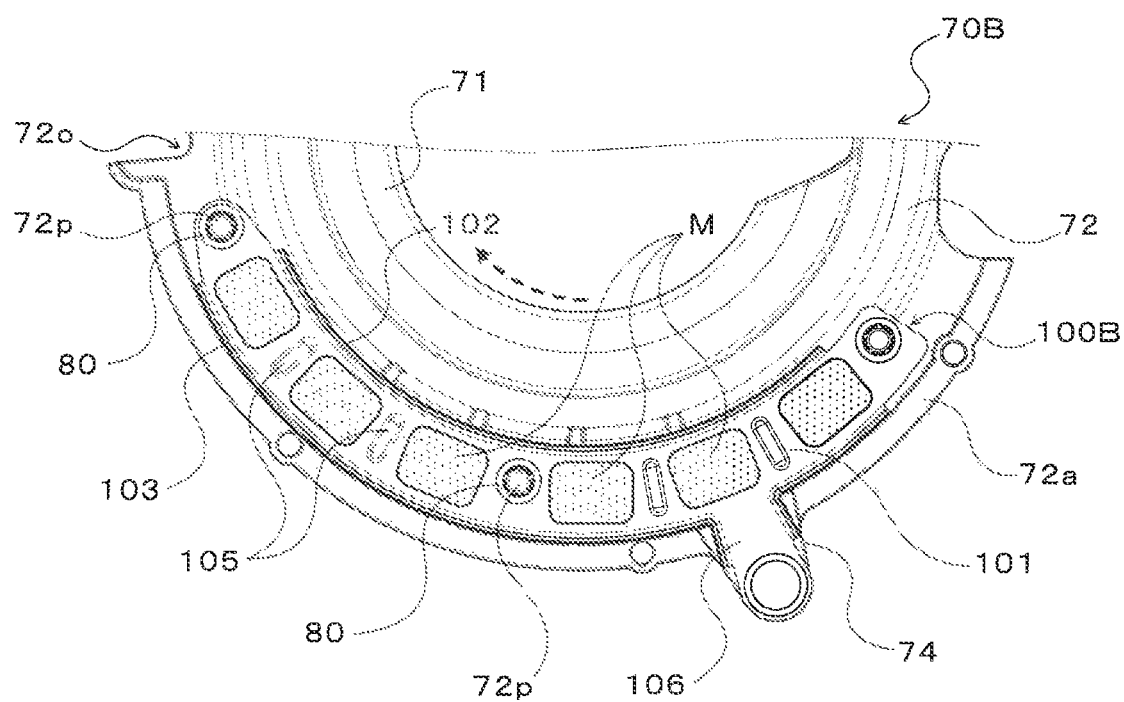
FIG. 7 is an enlarged view illustrating a main part of a partitioning member according to a modification of the present disclosure.

FIG. 7 is an enlarged view illustrating a main part of a reservoir plate 70B according to a modification. In the reservoir plate 70B illustrated in that drawing, the flange portion 72 has no holding wall portion 72w. Furthermore, a metal plate 100B fixed to the reservoir plate 70B has no disk-shaped held portion at each end around the through hole through which the projection 72p of the flange portion 72 is inserted, and instead has a fixing portion 106. The fixing portion 106 extends from the lower rib 103 in the radially outward direction of the reservoir plate 70B in such a manner as to cover the first fixing portion 74 of the reservoir plate 70B when each of the projections 72p of the flange portion 72 is inserted through the corresponding through hole. The fixing portion 106 of the metal plate 100B and the first fixing portion 74 of the reservoir plate 70B are fixed by a bolt or the like to the transaxle case 222 of the transmission case 22. This structure also makes it possible that the metal plate 100B is firmly fixed to the flange portion 72 of the reservoir plate 70B so as not to rattle.

Figure 8:
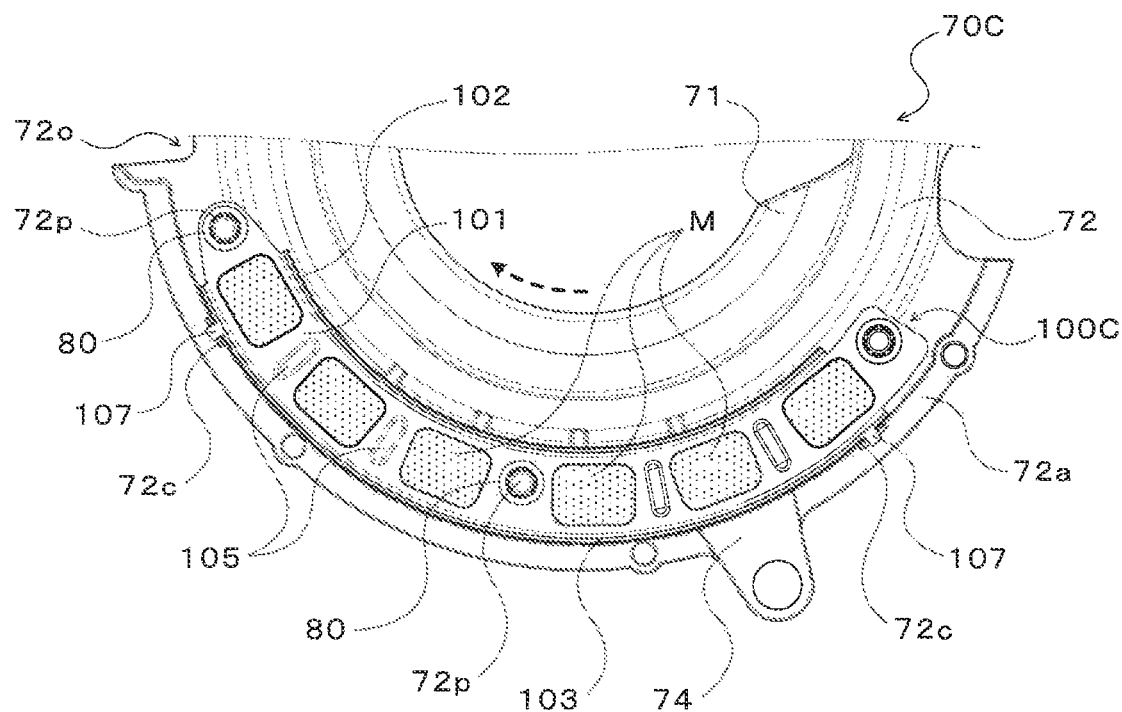
FIG. 8 is an enlarged view illustrating a partitioning member according to another modification of the present disclosure.
Figure 9:
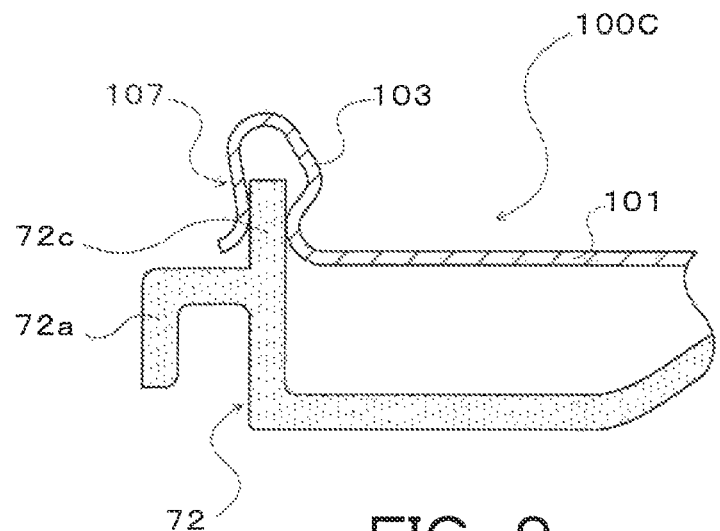
FIG. 9 is an enlarged cross-sectional view illustrating a main part of the partitioning member in FIG. 8.

FIG. 8 is an enlarged view illustrating a main part of a reservoir plate 70C according to another modification. In the reservoir plate 70C illustrated in that drawing as well, the flange portion 72 has no holding wall portion 72w. Furthermore, a metal plate 100C fixed to the reservoir plate 70C has no disk-shaped held portion at each end around through which through hole that the projection 72p of the flange portion 72 is inserted, and instead has multiple (two in the example of FIG. 8) engagement portions 107 that are formed at the lower rib 103 and that are spaced from each other in the circumferential direction (in the longitudinal direction) of the bottom portion 101. As illustrated in FIG. 9, each of the engagement portions 107 is formed by folding a narrow projecting piece extending from the lower rib 103 back toward the rib base end at the outward side (the left side in FIG. 9) of the lower rib 103. Furthermore, each of the engagement portions 107 is fitted and crimped on a corresponding engagement projection 72c that is formed at the lower outer peripheral edge 72a of the flange portion 72. This structure also satisfactorily restrains the metal plate 100C from rattling against the reservoir plate 70C.

Figure 10:
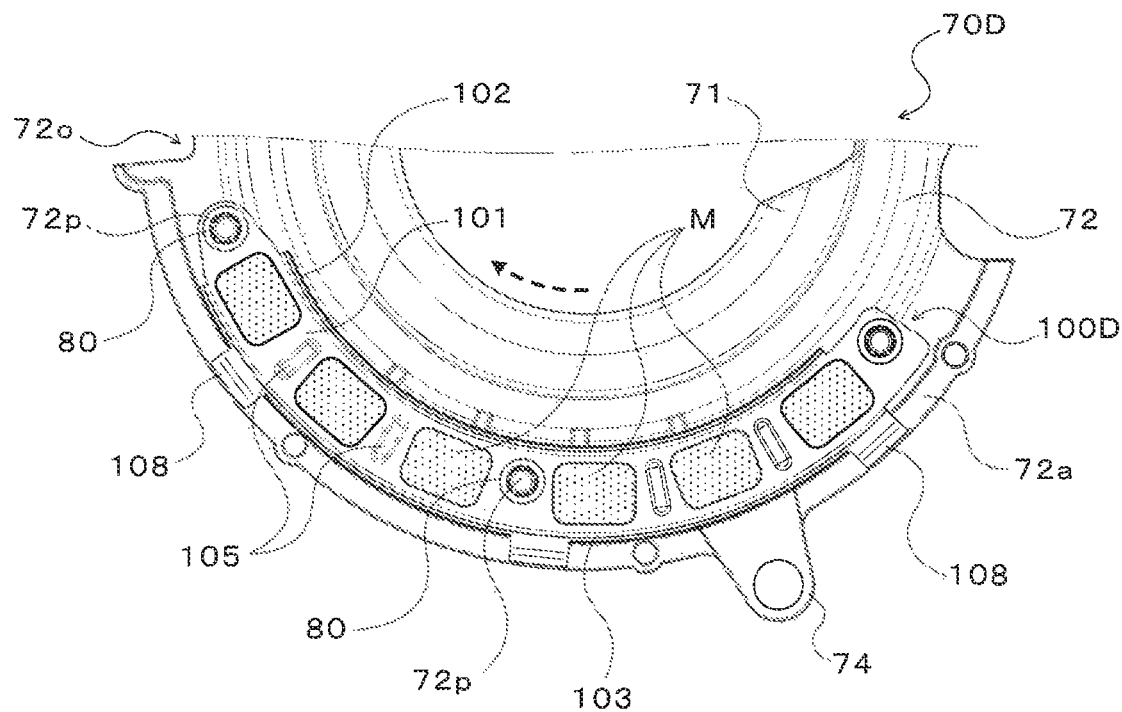
FIG. 10 is an enlarged view illustrating a partitioning member according to still another modification of the present disclosure.
Figure 11:
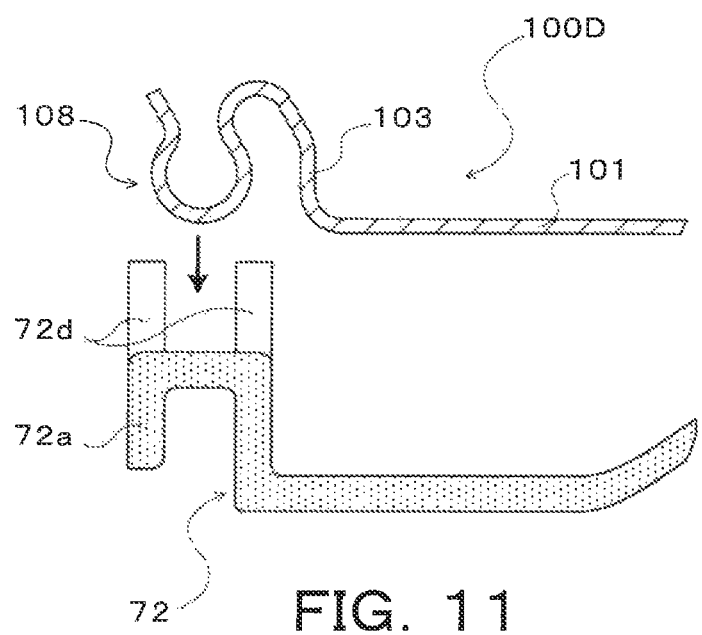
FIG. 11 is an enlarged cross-sectional view illustrating a main part of the partitioning member in FIG. 10.

FIG. 10 is an enlarged view illustrating a reservoir plate 70D according to still another modification. In the reservoir plate 70D illustrated in that drawing as well, the flange portion 72 has no holding wall portion 72w. Furthermore, a metal plate 100D fixed to the reservoir plate 70D has no disk-shaped held portion at each end around the through hole through which the projection 72p of the flange portion 72 is inserted, and instead has multiple (three in the example of FIG. 10) engagement portions 108 that are formed at the lower rib 103 and that are spaced from each other in the circumferential direction (in the longitudinal direction) of the bottom portion 101. As illustrated in FIG. 11, each of the engagement portions 108 has a plate spring shape and is formed by first bending a projecting piece extending from the lower rib 103 toward the rib base end at the outward side (the left side in FIG. 11) of the lower rib 103 and then bending the projecting piece toward the rib free end. Each of the engagement portions 108 is elastically deformed by being fitted between a pair of engagement walls 72d that face each other and that are formed at the lower outer peripheral edge 72a of the flange portion 72. Because of the elasticity of the engagement portions 108 having a plate spring shape, this structure also satisfactorily restrains the metal plate 100D from rattling against the reservoir plate 70D.

Figure 12:
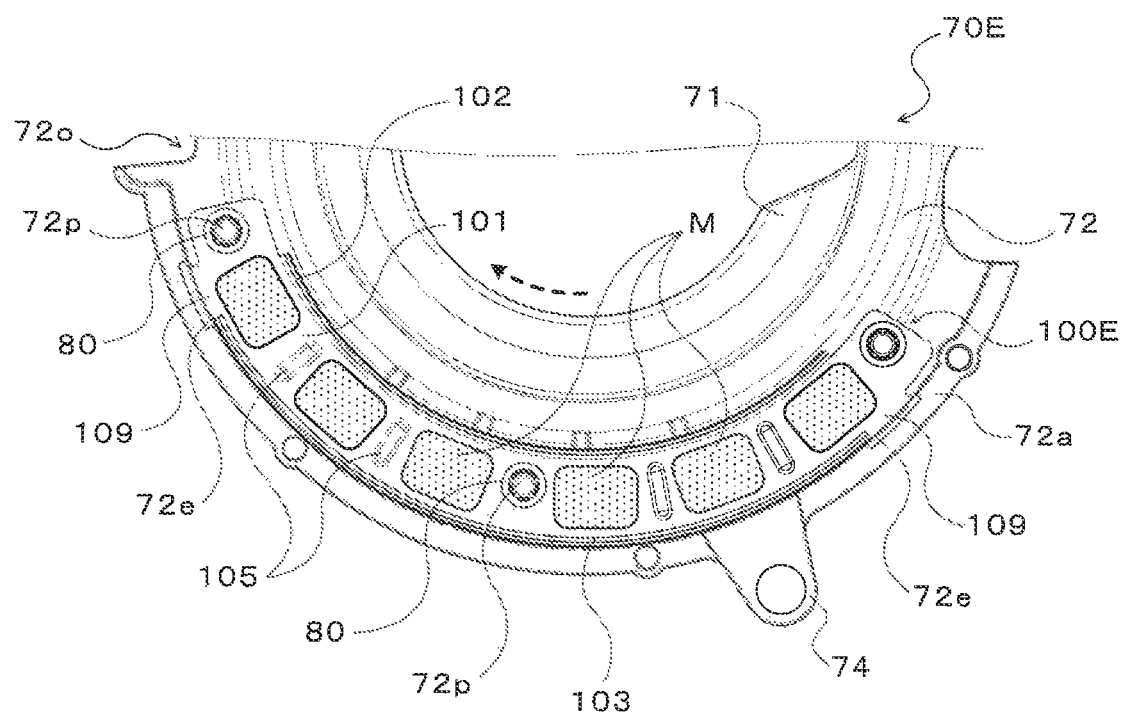
FIG. 12 is an enlarged view illustrating a partitioning member according to another modification of the present disclosure.
Figure 13:
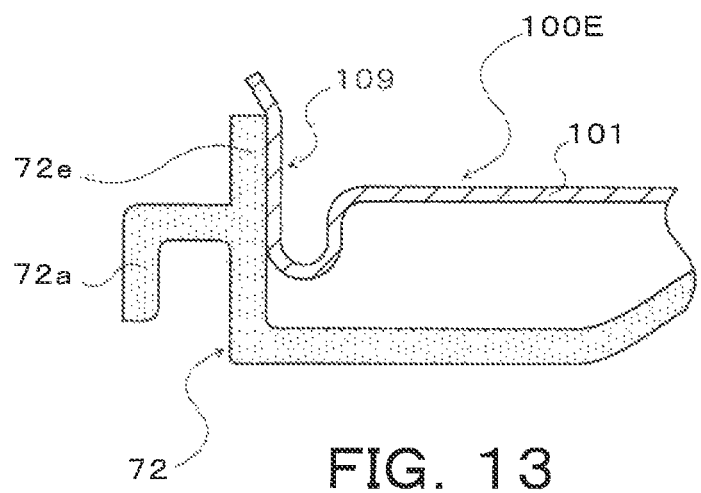
FIG. 13 is an enlarged cross-sectional view illustrating a main part of the partitioning member in FIG. 12.

FIG. 12 is an enlarged view illustrating a main part of a reservoir plate 70E according to another modification. In the reservoir plate 70E illustrated in that drawing as well, the flange portion 72 has no holding wall portion 72w. Furthermore, a metal plate 100E fixed to the reservoir plate 70E has no disk-shaped held portion at each end around the through hole through which the projection 72p of the flange portion 72 is inserted, and instead has multiple (two in the example of FIG. 10) engagement portions 109 that are formed at the lower rib 103 and that are spaced from each other in the circumferential direction (in the longitudinal direction) of the bottom portion 101. As illustrated in FIG. 13, each of the engagement portions 109 has a plate spring shape and is formed by first bending a part of the lower rib 103 in a direction far away from a free end of the lower rib 103 and then bending the part toward the free end. The metal plate 100E is fixed to the flange portion 72 by the projections 72p and the stopper rings 80 such that each of the engagement portions 109 is elastically deformed by being in close contact with an inner circumferential surface of an engagement wall 72e formed at the lower outer peripheral edge 72a of the flange portion 72. Because of the elasticity (the radial reaction force) of the engagement portions 108 having a plate spring shape, this structure also satisfactorily restrains the metal plate 100E from rattling against the reservoir plate 70E.

Figure 14:
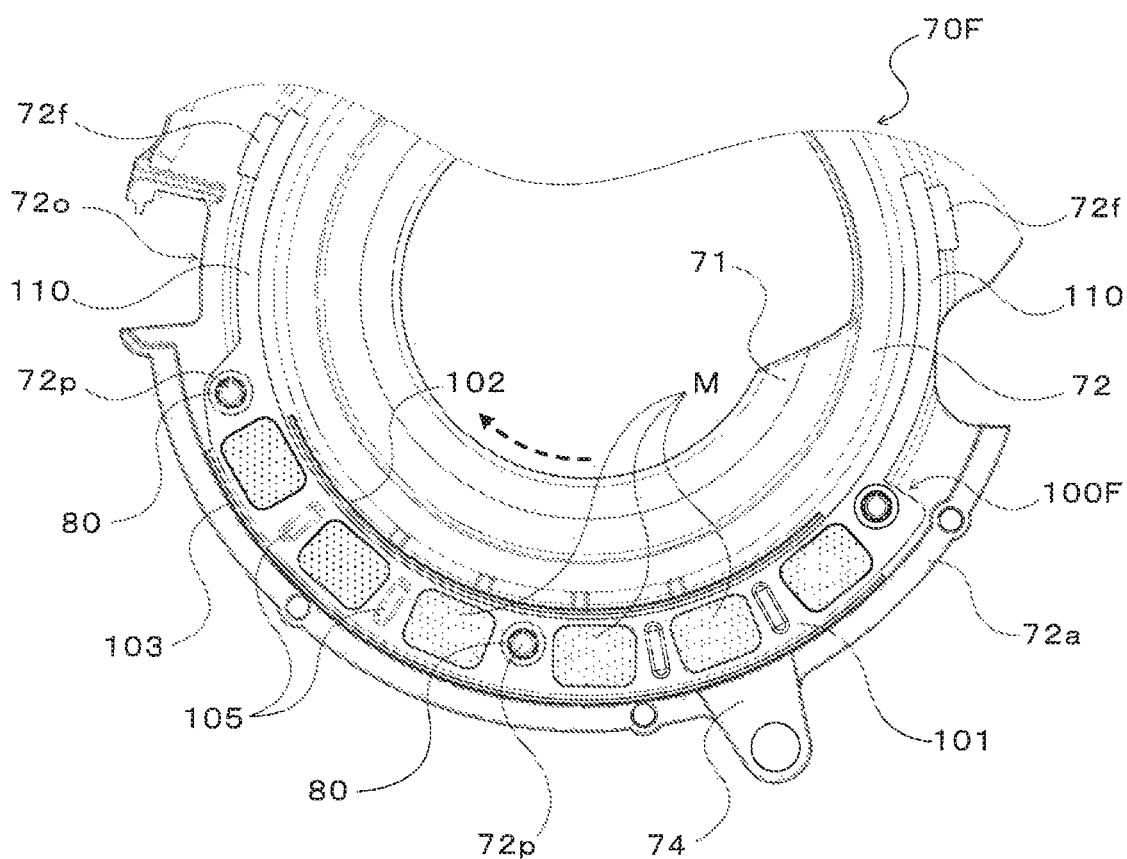
FIG. 14 is an enlarged view illustrating a partitioning member according to still another modification of the present disclosure.

FIG. 14 is an enlarged view illustrating a reservoir plate 70F according to still another modification. In the reservoir plate 70F illustrated in that drawing as well, the flange portion 72 has no holding wall portion 72w. Furthermore, a metal plate 100F fixed to the reservoir plate 70F has no disk-shaped held portion at each end around the through hole through which the projection 72p of the flange portion 72 is inserted, and instead has an arc-shaped engagement portion 110 that extends from each end of the bottom portion 101. The metal plate 100E is fixed to the flange portion 72 by the projections 72p and the stopper rings 80 such that a tip end of each of the engagement portions 110 is elastically deformed radially inward by abutting against an inner circumferential surface of an engagement wall 72f formed at the flange portion 72. Because of the elasticity (the radial reaction force) of the engagement portions 110 as a plate spring, this structure also satisfactorily restrains the metal plate 100F from rattling against the reservoir plate 70F.

As described above, the power transmission device (20) according to the present disclosure includes: a differential ring gear (45) that meshes with a drive pinion gear (44) to which power from a transmission (25) is transmitted; a differential gear (50) including a differential case (54) coupled to the differential ring gear (45); a case (22) that houses the differential ring gear (45) and the differential gear (50); and a resinous partitioning member (i.e., partition) (70, 70B, 70C, 70D, 70E, 70F) that partitions an inside of the case (22) into a differential chamber (60) where the differential ring gear (45) and the differential gear (50) are placed and a working oil reservoir chamber (65) to reserve working oil, and is characterized in that the partitioning member (70, 70B, 70C, 70D, 70E, 70F) includes a magnetic plate (100, 100B, 100C, 100D, 100E, 100F) fixed to a lower part of a side surface thereof that faces the working oil reservoir chamber (65), and a magnet (M) attracted and attached to the magnetic plate.

In the power transmission device according to the present disclosure, the inside of the case that houses the differential ring gear and the differential gear is partitioned by the resinous partitioning member into the differential chamber and the working oil reservoir chamber. Furthermore, the partitioning member includes the magnetic plate fixed to the lower part of the side surface thereof that faces the working oil reservoir chamber, and the magnet magnetically attracted and attached to the magnetic plate. Since the magnet is attracted and attached to the magnetic plate fixed to the partitioning member, the resinous partitioning member does not need to have a holding portion, such as a hook portion, for holding the magnet. This makes, without consideration of changes in dimensions and strength of the holding portion associated with thermal deformation of the partitioning member, it possible to mount the magnet to the partitioning member such that the magnet does not become displaced relative to the partitioning member, thus restraining foreign matter attracted and stuck to the magnet from being dispersed again into the working oil by coming in contact with the holding portion or the like due to a relative displacement between the magnet and the holding portion. Accordingly, the power transmission device according to the present disclosure allows the magnet for catching foreign matter inside the working oil reservoir chamber defined by the resinous partitioning member to be firmly fixed to the partitioning member while satisfactorily restraining the foreign matter stuck to the magnet from being dispersed.

The magnetic plate (100, 100B, 100C, 100D, 100E, 100F) may have an upper rib (102) extending along an upper edge thereof and a lower rib (103) extending along a lower edge thereof and may be fixed to the lower part of the side surface of the partitioning member (70, 70B, 70C, 70D, 70E, 70F) facing the working oil reservoir chamber (65) such that the upper rib (102) and the lower rib (103) project toward the working oil reservoir chamber (65). The magnet (M) may be magnetically attracted and attached to the magnetic plate (100, 100B, 100C, 100D, 100E, 100F) between the upper rib (102) and the lower rib (103).

Providing the magnetic plate with the upper rib and the lower rib in this way allows the magnetic plate to have more strength. This reduces vibration of the magnetic plate and restrains the magnetic plate from becoming deformed (bent) when vibration from a vehicle is transmitted to the partitioning member, thus highly satisfactorily restraining the magnet magnetically attracted and attached to the magnetic plate from coming off. In addition, the upper rib and the lower rib that project toward the working oil reservoir chamber restrains strong flow of the working oil from occurring around the magnet, such as when a vehicle starts suddenly, stops suddenly, or moves over a bump. This satisfactorily restrains the magnet from being displaced by the flow of the working oil and also satisfactorily restrains foreign matter stuck to the magnet from being dispersed into the working oil.

An amount by which the upper rib (102) and the lower rib (103) project from a front surface of the magnetic plate (100, 100B, 100C, 100D, 100E, 100F) to which the magnet (M) is attracted and attached may be greater than a thickness from the front surface of the magnetic plate to a surface of the magnet (M) facing the working oil reservoir chamber (65). This allows the magnetic plate to have much more strength while highly satisfactorily restraining strong flow of the working oil from occurring around the magnet.

The partitioning member (70, 70B, 70C, 70D, 70E, 70F) may further include a plurality of the magnets (M) arranged along the upper rib (102) and the lower rib (103), and the magnetic plate (100, 100B, 100C, 100D, 100E, 100F) may include a projecting portion (i.e., projection) (105) located between adjacent ones of the magnets (M) and projecting from the front surface of the magnetic plate toward the working oil reservoir chamber (65). This highly satisfactorily restrains the magnet from being displaced relative to the magnetic plate due to vibration of the magnetic plate and the flow of the working oil.

Furthermore, a disk-shaped held portion (104) with a through hole may be formed at each end of the magnetic plate (100), and the partitioning member (70) may include a plurality of projections (72p) each inserted through a corresponding one of the through holes and provided with a stopper ring (80) press-fitted thereon, and a plurality of holding wall portions (72w) extending in an arc shape to surround the projections (72p) and holding the held portions (104) of the magnetic plate (100). This facilitates positioning the magnetic plate relative to the partitioning member so as to improve workability while highly satisfactorily restraining the magnetic plate from rattling against the partitioning member.

Furthermore, the partitioning member (70, 70B, 70C, 70D, 70E, 70F) may include a cover portion (i.e., cover) (71) that covers at least part of the differential case (54), and a flange portion (i.e., flange) (72) projecting radially outward from an end of the tubular cover portion (71) and extending in an arc shape along the end, and the magnetic plate (100, 100B, 100C, 100D, 100E, 100F) may have a substantially arc shape and may be fixed to a lower part of the flange portion (72).

Furthermore, the partitioning member (70, 70B, 70C, 70D, 70E, 70F) may include an outlet (72o) for discharging the working oil scooped up by the differential ring gear (45) from the differential chamber (60) into the working oil reservoir chamber (65), and the magnet (M) may be located below the outlet (72o). This makes it possible to quickly catch foreign matter that is contained in the working oil flowed into the working oil reservoir chamber through the outlet.

Furthermore, the partitioning member (70, 70B, 70C, 70D, 70E, 70F) may be arranged in an arc pattern on the magnetic plate (100, 100B, 100C, 100D, 100E, 100F). This increases design flexibility using general-purpose magnets while appropriately ensuring the area to which foreign matter is attracted and stuck.

A space (S) may be defined between the side surface of the partitioning member (70, 70B, 70C, 70D, 70E, 70F) and a surface of the magnetic plate (100, 100B, 100C, 100D, 100E, 100F) opposite the front surface to which the magnet (M) is attracted and attached. This allows a part of the magnet facing the magnetic plate (close to the differential chamber) to be used as a portion to which foreign matter is attracted and stuck, thus increasing the area to which foreign matter is attracted and stuck.

Furthermore, the partitioning member (70, 70B, 70C, 70D, 70E, 70F) may have a projection (72p) projecting toward the working oil reservoir chamber (65), and the magnetic plate (100, 100B, 100C, 100D, 100E, 100F) may have a through hole through which the projection (72p) is inserted. In this case, a stopper ring may be press-fitted on the projection inserted through the through hole. The stopper ring may be formed as one piece with the magnetic body or may be omitted, for example, when the projection is press-fitted into the through hole.

The disclosure according to the present disclosure is not limited at all to the embodiment described above, and various modifications are possible within the scope of the present disclosure. In addition, the embodiment of the disclosure is merely one specific example of the disclosure described in SUMMARY and does not limit the elements of the disclosure described in SUMMARY.

INDUSTRIAL APPLICABILITY

The disclosure according to the present disclosure is usable, for example, in the industry of manufacturing power transmission devices.

The invention claimed is:

1. A power transmission device comprising:
a differential ring gear that meshes with a drive pinion gear to which power from a transmission is transmitted;
a differential gear including a differential case coupled to the differential ring gear;
a case that houses the differential ring gear and the differential gear; and
a resinous partition that partitions an inside of the case into a differential chamber where the differential ring gear and the differential gear are placed and a working oil reservoir chamber to reserve working oil, wherein
the partition includes a magnetic plate fixed to a lower part of a side surface thereof that faces the working oil reservoir chamber, and a magnet magnetically attracted and attached to the magnetic plate such that an entire surface of the magnet facing the working oil reservoir chamber is unobstructed.

2. The power transmission device according to claim 1, wherein
the magnetic plate has an upper rib extending along an upper edge thereof and a lower rib extending along a lower edge thereof, and is fixed to the lower part of the side surface of the partition facing the working oil reservoir chamber such that the upper rib and the lower rib project toward the working oil reservoir chamber, and
the magnet is magnetically attracted and attached to the magnetic plate between the upper rib and the lower rib.

3. The power transmission device according to claim 2, wherein
an amount by which the upper rib and the lower rib project from a front surface of the magnetic plate to which the magnet is attracted and attached is greater than a thickness from the front surface of the magnetic plate to the surface of the magnet facing the working oil reservoir chamber.

4. The power transmission device according to claim 3, wherein
the partition includes a plurality of the magnets arranged along the upper rib and the lower rib, and
the magnetic plate includes a projection located between adjacent ones of the plurality of the magnets and projecting from the front surface of the magnetic plate toward the working oil reservoir chamber.

5. The power transmission device according to claim 4, wherein
a disk-shaped held portion with a through hole is formed at each end of the magnetic plate, and
the partition includes a plurality of projections each inserted through a corresponding one of the through holes and provided with a stopper ring press-fitted thereon, and a plurality of holding wall portions extending in an arc shape to surround the plurality of projections and holding the held portions of the magnetic plate.

6. The power transmission device according to claim 5, wherein
the partition includes a cover that covers at least part of the differential case, and a flange projecting radially outward from an end of the cover and extending in an arc shape along the end, and
the magnetic plate has an arc shape and is fixed to a lower part of the flange.

7. The power transmission device according to claim 6, wherein
the partition includes an outlet for discharging the working oil scooped up by the differential ring gear from the differential chamber into the working oil reservoir chamber, and
the magnet is located below the outlet.

8. The power transmission device according to claim 7, wherein
the partition includes a plurality of the magnets arranged in an arc pattern on the magnetic plate.

9. The power transmission device according to claim 8, wherein
a space is defined between the side surface of the partition and a surface of the magnetic plate opposite a front surface to which the magnet is attracted and attached.

10. The power transmission device according to claim 9, wherein
the partition has a projection projecting toward the working oil reservoir chamber, and
the magnetic plate has a through hole through which the projection is inserted.

11. The power transmission device according to claim 2, wherein a gap is provided between at least one of the upper rib and the lower rib.

12. The power transmission device according to claim 1, wherein
a disk-shaped held portion with a through hole is formed at each end of the magnetic plate, and
the partition includes a plurality of projections each inserted through a corresponding one of the through holes and provided with a stopper ring press-fitted thereon, and a plurality of holding wall portions extending in an arc shape to surround the plurality of projections and holding the held portions of the magnetic plate.

13. The power transmission device according to claim 1, wherein
the partition includes a cover that covers at least part of the differential case, and a flange projecting radially outward from an end of the cover and extending in an arc shape along the end, and
the magnetic plate has an arc shape extending from the lower part of the resinous partition to an upper part of the resinous partition that faces the working oil reservoir chamber, and the magnetic plate is fixed to the lower part of the partition.

14. The power transmission device according to claim 1, wherein
the partition includes an outlet for discharging the working oil scooped up by the differential ring gear from the differential chamber into the working oil reservoir chamber, and
the magnet is located below the outlet.

15. The power transmission device according to claim 1, wherein
the partition includes a plurality of the magnets arranged in an arc pattern on the magnetic plate from the lower part of the side surface to an upper part of the side surface that faces the working oil reservoir chamber.

16. The power transmission device according to claim 1, wherein
a space is defined between the side surface of the partition and a surface of the magnetic plate opposite a front surface to which the magnet is attracted and attached.

17. The power transmission device according to claim 1, wherein
 the partition has a projection projecting toward the working oil reservoir chamber, and
 the magnetic plate has a through hole through which the projection is inserted.

* * * * *